(12) United States Patent
Midorikawa

(10) Patent No.: US 12,684,234 B2
(45) Date of Patent: Jul. 14, 2026

(54) FOCUS ADJUSTMENT APPARATUS CAPABLE OF PREDICTING AN IN-FOCUS POSITION OF A SUBJECT AND METHOD, IMAGE CAPTURING APPARATUS, AND STORAGE MEDIUM

(71) Applicant: CANON KABUSHIKI KAISHA, Tokyo (JP)

(72) Inventor: Keisuke Midorikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 18/735,691

(22) Filed: Jun. 6, 2024

(65) Prior Publication Data

US 2024/0422431 A1 Dec. 19, 2024

(30) Foreign Application Priority Data

Jun. 13, 2023 (JP) ................................. 2023-097246

(51) Int. Cl.
*H04N 23/67* (2023.01)

(52) U.S. Cl.
CPC ................................... *H04N 23/67* (2023.01)

(58) Field of Classification Search
CPC ...... H04N 23/67; H04N 23/61; H04N 23/611; H04N 23/672; H04N 23/675
See application file for complete search history.

(56) References Cited

U.S. PATENT DOCUMENTS

| | | | | |
|---|---|---|---|---|
| 2007/0263997 A1* | 11/2007 | Hirai | ................... | H04N 23/611 |
| | | | | 348/E5.045 |
| 2019/0020826 A1* | 1/2019 | Takehara | ............. | H04N 25/674 |
| 2022/0086359 A1* | 3/2022 | Aoba | ................... | H04N 23/675 |
| 2022/0279132 A1* | 9/2022 | Watanabe | ............ | H04N 23/675 |
| 2022/0294991 A1* | 9/2022 | Hoshino | ............. | H04N 23/672 |

FOREIGN PATENT DOCUMENTS

JP 2001021794 A 1/2001

* cited by examiner

*Primary Examiner* — Gevell V Selby
(74) *Attorney, Agent, or Firm* — Cowan, Liebowitz & Latman, P.C.

(57) ABSTRACT

A focus adjustment apparatus comprising: a detection unit that detects first and second parts of a subject from an image; an acquisition unit that acquires focus states of the first and second parts; a storage unit that stores the focus states of the first and second parts; a prediction unit that, based on the focus states of the first and second parts of an image obtained at a first time, and the focus states of the first and second parts of an image, obtained at a second time before the first time, which are stored in the storage unit, predicts focus states at a third time after the first time; and a focus adjustment unit that performs focus adjustment processing based on the predicted focus states in a case where a difference between the predicted focus states satisfies a predetermined condition.

18 Claims, 5 Drawing Sheets

F I G. 1
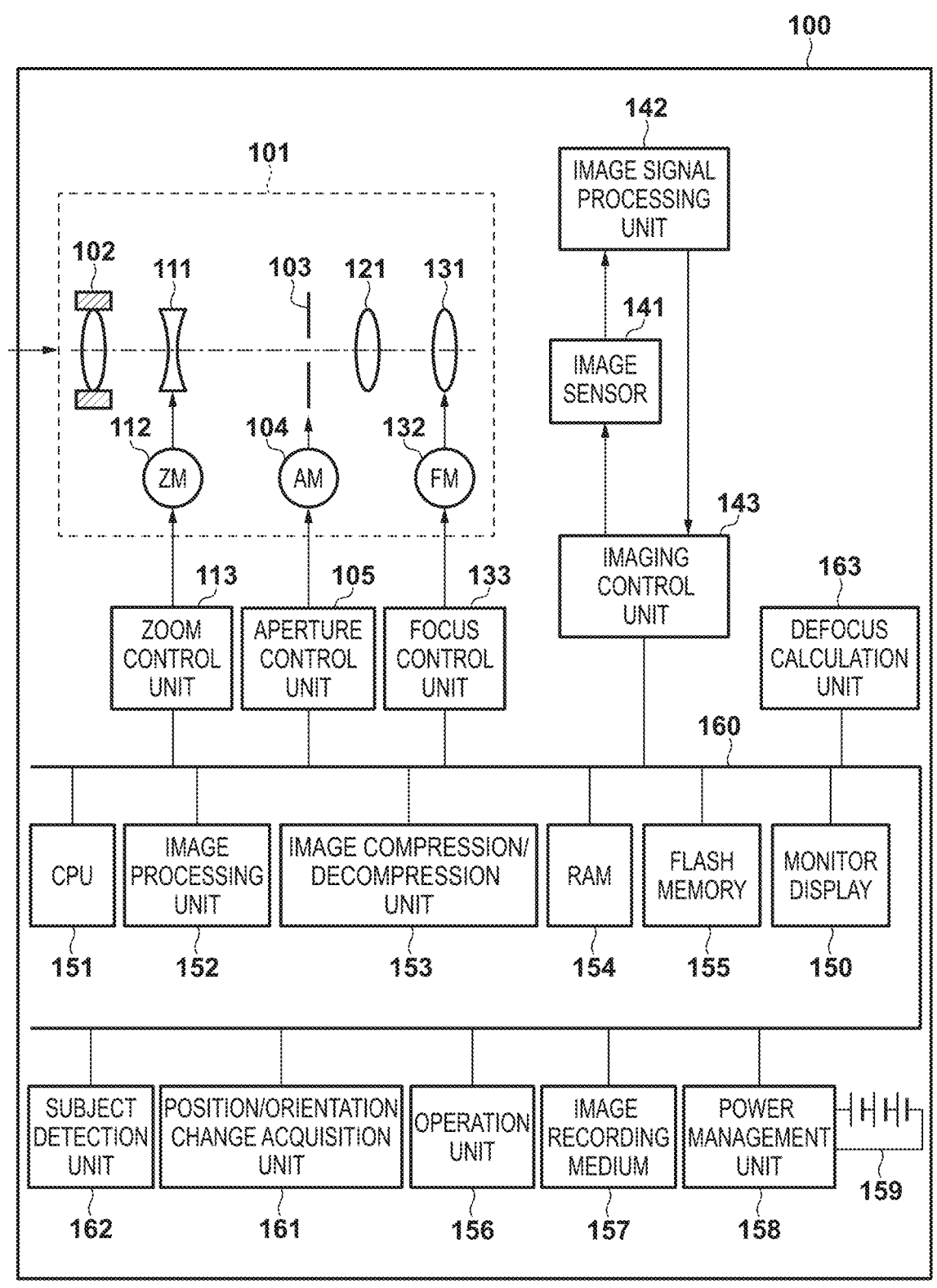

F I G. 2
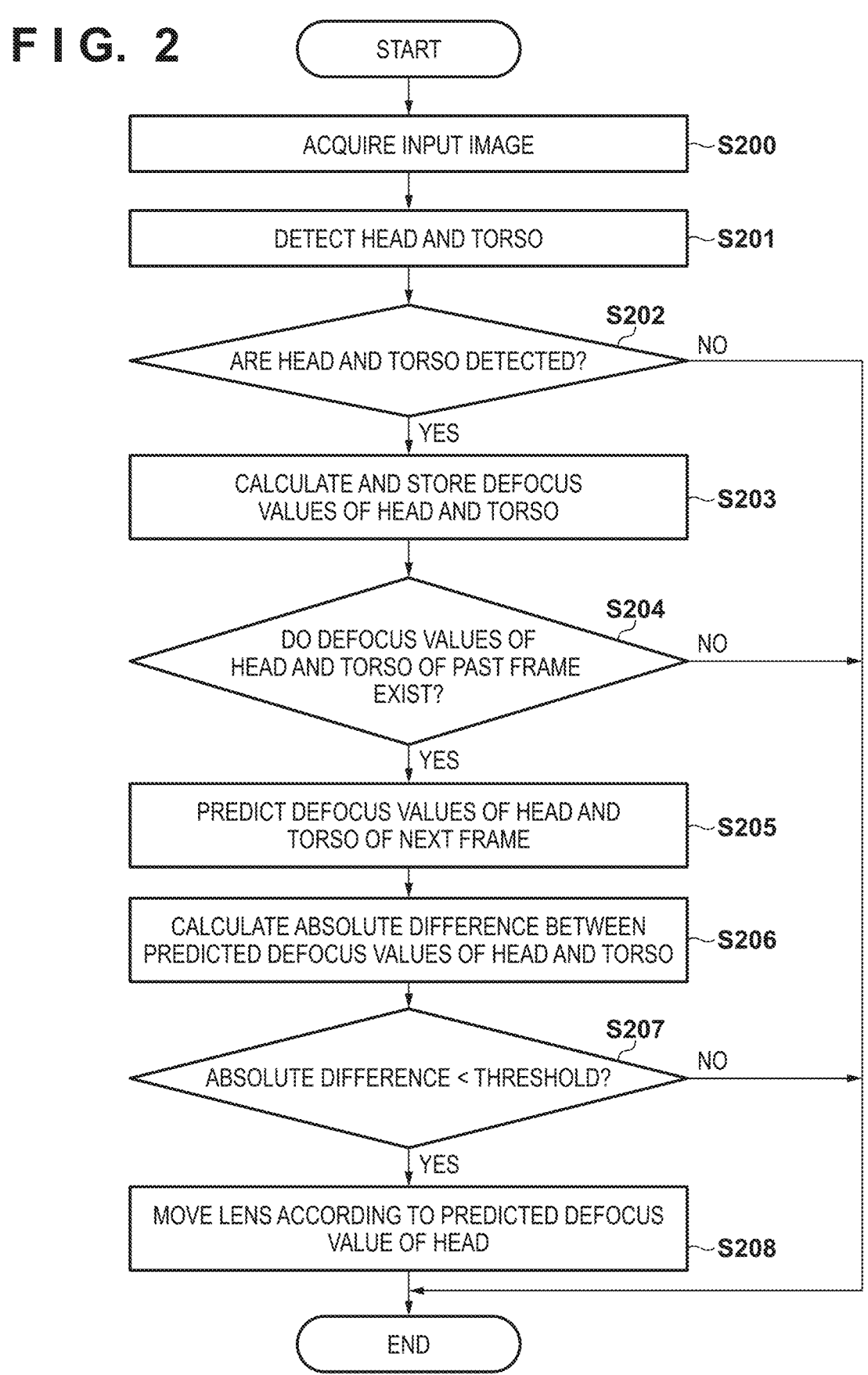

F I G. 3
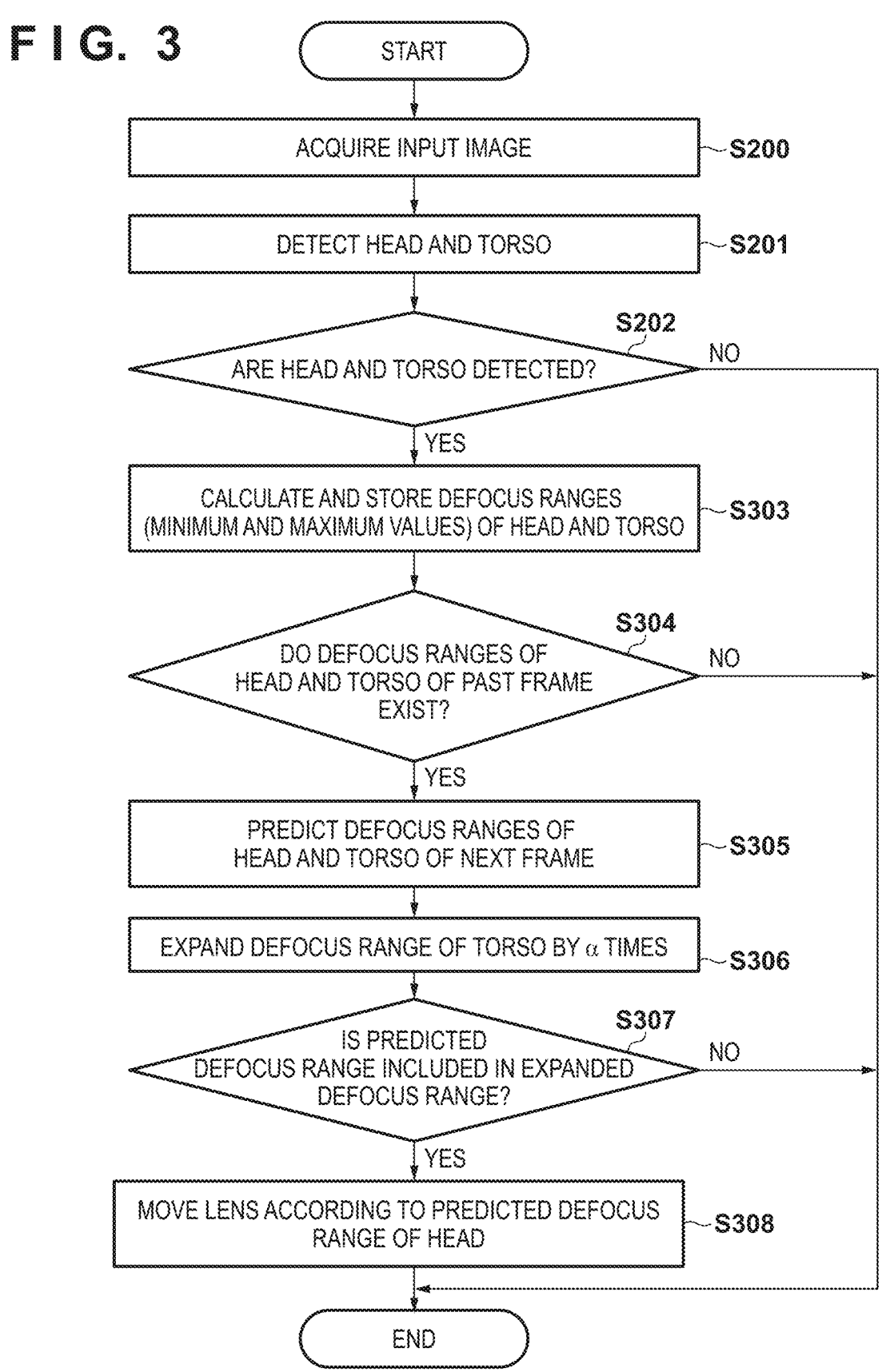

FOCUS ADJUSTMENT APPARATUS CAPABLE OF PREDICTING AN IN-FOCUS POSITION OF A SUBJECT AND METHOD, IMAGE CAPTURING APPARATUS, AND STORAGE MEDIUM

BACKGROUND OF THE INVENTION

Field of the Invention

The present invention relates to a focus adjustment apparatus and method, image capturing apparatus, and storage medium, and particularly relates to a technique for predicting an in-focus position of a subject.

Description of the Related Art

In autofocus (AF) control in conventional image capturing apparatuses, it is common practice to perform focus detection on a desired area within an imaging screen and actuate a focus lens based on the result. Furthermore, in recent years, as pixels in image capturing apparatuses have become finer and images with higher resolution can be captured, more accurate focus adjustment control is required.

On the other hand, Japanese Patent Laid-open No. 2001-21794 discloses a method of predicting a position that will be focused on in the future by, for a moving subject, approximating the change in the in-focus position with respect to time due to the movement of the subject using a pre-designed function.

However, depending on the movement of the subject, the prediction of the in-focus position may be wrong, and in a case where the prediction is wrong, it may not be possible to obtain an image with a desired focus state.

SUMMARY OF THE INVENTION

The present invention has been made in consideration of the above situation, and in a case where focus adjustment is performed by predicting a future in-focus position, suppresses the deterioration of the focus state of an image due to misprediction of the in-focus position.

According to the present invention, provided is a focus adjustment apparatus comprising one or more processors and/or circuitry which functions as: a detection unit that detects predetermined first part and second part of a predetermined subject from an image captured by shooting; an acquisition unit that acquires a focus state of each of the first part and the second part detected by the detection unit; a storage unit that stores the focus states of the first part and the second part acquired by the acquisition unit; a prediction unit that, based on the focus states of the first part and the second part of an image obtained at a first time, and the focus states of the first part and the second part of an image, obtained at a second time before the first time, which are stored in the storage unit, predicts focus states of the first part and the second part at a third time after the first time; and a focus adjustment unit that performs focus adjustment processing, wherein the focus adjusting unit performs the focus adjustment processing based on the predicted focus states of the first part and the second part in a case where a difference between the focus state of the first part and the focus state of the second part predicted by the prediction unit satisfies a predetermined condition.

Further, according to the present invention, provided is an image capturing apparatus comprising: a focus detection apparatus comprising one or more processors and/or circuitry which functions as: a detection unit that detects predetermined first part and second part of a predetermined subject from an image captured by shooting; an acquisition unit that acquires a focus state of each of the first part and the second part detected by the detection unit; a storage unit that stores the focus states of the first part and the second part acquired by the acquisition unit; a prediction unit that, based on the focus states of the first part and the second part of an image obtained at a first time, and the focus states of the first part and the second part of an image, obtained at a second time before the first time, which are stored in the storage unit, predicts focus states of the first part and the second part at a third time after the first time; and a focus adjustment unit that performs focus adjustment processing, and an image sensor that captures the image, wherein the focus adjusting unit performs the focus adjustment processing based on the predicted focus states of the first part and the second part in a case where a difference between the focus state of the first part and the focus state of the second part predicted by the prediction unit satisfies a predetermined condition.

Furthermore, according to the present invention, provided is a focus adjustment method comprising: detecting predetermined first part and second part of a predetermined subject from an image captured by shooting; acquiring a focus state of each of the first part and the second part detected in the detecting; storing the focus states of the first part and the second part acquired in the acquiring; predicting, based on the focus states of the first part and the second part of an image obtained at a first time, and the focus states of the first part and the second part of an image, obtained at a second time before the first time, which are stored in the storage unit, focus states of the first part and the second part at a third time after the first time; and performing focus adjustment processing, wherein the focus adjustment processing is performed based on the predicted focus states of the first part and the second part in a case where a difference between the focus state of the first part and the focus state of the second part predicted in the predicting satisfies a predetermined condition.

Further, according to the present invention, provided is a non-transitory computer-readable storage medium, the storage medium storing a program that is executable by the computer, wherein the program includes program code for causing the computer to function as a focus adjustment apparatus comprising: a detection unit that detects predetermined first part and second part of a predetermined subject from an image captured by shooting; an acquisition unit that acquires a focus state of each of the first part and the second part detected by the detection unit; a storage unit that stores the focus states of the first part and the second part acquired by the acquisition unit; a prediction unit that, based on the focus states of the first part and the second part of an image obtained at a first time, and the focus states of the first part and the second part of an image, obtained at a second time before the first time, which are stored in the storage unit, predicts focus states of the first part and the second part at a third time after the first time; and a focus adjustment unit that performs focus adjustment processing, wherein the focus adjusting unit performs the focus adjustment processing based on the predicted focus states of the first part and the second part in a case where a difference between the focus state of the first part and the focus state of the second part predicted by the prediction unit satisfies a predetermined condition.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram illustrating a configuration of an image capturing apparatus according to an embodiment of the present invention.

FIG. 2 is a flowchart illustrating predictive focus adjustment processing according to a first embodiment.

FIG. 3 is a flowchart illustrating predictive focus adjustment processing according to a second embodiment.

DESCRIPTION OF THE EMBODIMENTS

Figure 4:
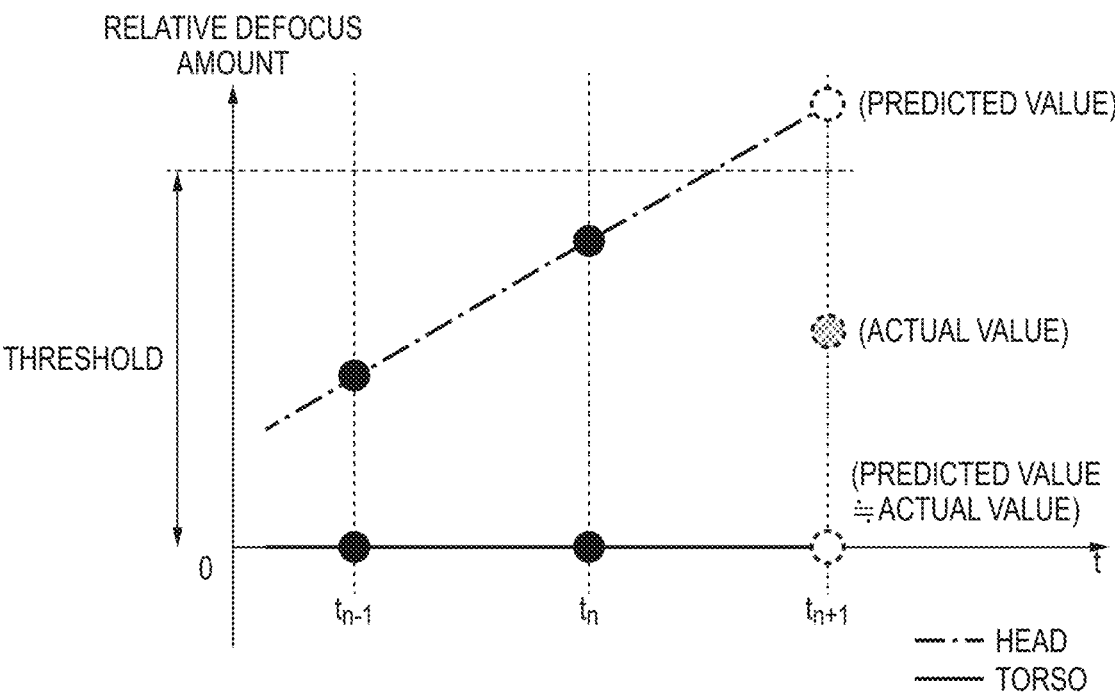
FIG. 4 is a diagram illustrating an example of the concept of absolute differences of predicted defocus values according to the first embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

First, with reference to FIG. 1, a configuration of an image capturing apparatus in this embodiment will be described. FIG. 1 is a block diagram showing the configuration of an image capturing apparatus 100. In this embodiment, the image capturing apparatus 100 will be described as a digital still camera that can shoot a subject and record an image of the subject as moving or still image data on various media such as a tape, a solid-state memory, an optical disk, or a magnetic disk. However, the present invention is not limited to digital still cameras, and may be applied to various electronic devices having a camera function. For example, the electronic devices may include a video camera, a mobile communication terminal with a camera function such as a mobile phone or a smartphone, a portable computer with a camera function, a portable game machine with a camera function, or the like.

Each component within the image capturing apparatus 100 is connected via a bus 160 and controlled by a central processing unit (CPU) 151.

A lens unit 101 includes a first fixed lens group 102, a zoom lens 111, an aperture 103, a second fixed lens group 121, and a focus lens 131, and may be integrally configured with the image capturing apparatus 100 or may be configured to be detachable.

An aperture control unit 105 adjusts the aperture diameter of the aperture 103 by actuating the aperture 103 via an aperture motor 104 (AM) in accordance with a command from the CPU 151, thereby adjusting the amount of light during shooting. At this time, the CPU 151 determines the aperture diameter of the aperture 103 using the luminance value of a specific subject area.

A zoom control unit 113 changes the focal length by driving the zoom lens 111 via a zoom motor 112 (ZM) in accordance with a command from the CPU 151.

A focus control unit 133 determines an actuation amount for actuating a focus motor 132 (FM) based on the amount of defocus (defocus amount) of the lens unit 101 with respect to the specific subject area. Then, the focus adjustment state is controlled by actuating the focus lens 131 with the determined actuation amount via the focus motor 132. Autofocus (AF) control is realized by controlling the movement of the focus lens 131 by the focus control unit 133 and the focus motor 132. Although the focus lens 131 is simply shown as a single lens in FIG. 1, it is usually composed of a plurality of lenses.

An image sensor 141 is a photoelectric conversion element that converts an optical image of the subject into an electrical signal by photoelectric conversion, and converts the optical image of the subject (subject image) formed on an imaging surface of the image sensor 141 via the lens unit 101 into an electrical signal. The image sensor 141 has light receiving elements of m pixels in the horizontal direction and n pixels in the vertical direction arranged in a matrix. An electrical signal (image signal) obtained by photoelectric conversion by the image sensor 141 is formed into image data by an image signal processing unit 142 and output.

The image data output from the image signal processing unit 142 is sent to an imaging control unit 143 and temporarily stored in a RAM 154. The image data stored in the RAM 154 is compressed by an image compression/decompression unit 153 and then recorded on an image recording medium 157.

In parallel with this, the image data stored in the RAM 154 is also sent to an image processing unit 152, and the image processing unit 152 performs processes such as reduction or enlargement of the sent image data to a size appropriate for the purpose, and similarity calculation between image data. The image data reduced to a display size is sent to a monitor display 150 as appropriate. The image processing unit 152 also performs gamma correction, white balance processing, etc. on the sent image data based on the image signal of the subject area.

The monitor display 150 can display a preview image or a through image by displaying an image based on image data reduced to a display size by the image processing unit 152. Furthermore, the monitor display 150 can superimpose the detection result of the subject by a subject detection unit 162 on the image data in the form of a rectangular frame or the like.

A position/orientation change acquisition unit 161 is configured with a position/orientation sensor such as a gyro, an acceleration sensor, or an electronic compass, and measures the position/orientation change of the image capturing apparatus 100 with respect to a shooting scene. The acquired position and orientation change is stored in the RAM 154.

The subject detection unit 162 uses image data to detect an area where a predetermined subject exists. Note that this area may be output as rectangular information, or may be output as a subject area map, which is an image whose pixel values represent "the likelihood that the subject exists."

The RAM 154 is used as a ring buffer, so the RAM 154 can buffer image data of a plurality of images captured within a predetermined period, detection result of the subject detection unit 162 corresponding to each image, and change in the position and orientation of the capturing apparatus 100 acquired by the position/orientation change acquisition unit 161.

An operation unit 156 is an input interface including a touch panel, buttons, etc., and an operator can perform various operations by selecting and operating various function icons displayed on the monitor display 150.

The CPU 151 determines the charge accumulation period of the image sensor 141 and the gain setting value at the time of outputting a signal from the image sensor 141 to the image signal processing unit 142 based on instructions from the operator input via the operation unit 156 or the signal level of the pixel signal of the image data temporarily stored in the RAM 154. The imaging control unit 143 receives instructions for charge accumulation period and gain setting value from the CPU 151, and controls the image sensor 141.

A battery 159 is managed by a power management unit 158 and stably supplies power to the entire image capturing apparatus 100.

A flash memory 155 stores control programs necessary for the operation of the image capturing apparatus 100, parameters used for the operation of each part, and the like. When the image capturing apparatus 100 is activated by a user's operation (transition from a power OFF state to a power ON state), the control program and parameters stored in the flash memory 155 are loaded into a part of the RAM 154. The CPU 151 controls the operation of the image capturing apparatus 100 according to the control programs and constants loaded into the RAM 154.

A defocus calculation unit 163 calculates a defocus amount in an arbitrary area in the image. Note that the defocus amount may be calculated at one point, or may be calculated at equal intervals over the entire image and output as a defocus map. The generated defocus information is stored in the RAM 154 and referenced by the focus control unit 133.

Note that the configuration described above is only an example of the configuration of the image capturing apparatus 100.

Next, a flow of predictive focus adjustment processing in this embodiment performed by the image capturing apparatus 100 having the above configuration will be described using FIG. 2.

In step S200, an image (input image) shot by the image sensor 141 is acquired, and image data of the acquired input image is supplied from the imaging control unit 143 to each unit.

Next, in step S201, the subject detection unit 162 performs subject detection processing on the input image and detects a plurality of parts (portions) from the detected subject. Note that in this embodiment, the subject to be detected is a person, and the head and torso of the person are detected. The subject detection unit 162 can perform subject detection using, for example, Convolutional Neural Networks (CNN), but any method may be used as long as the subject can be detected. The subject detection unit 162 detects the head and torso of the detected person, and outputs information on rectangular areas indicating the detected head and torso. Note that if either the head or the torso cannot be detected, information on a rectangular area indicating the detected head or torso may be output. Furthermore, if a plurality of heads and/or torsos are detected, which of them belongs to the subject of interest is selected.

The selection process at this time may be performed using any method, and realized by, for example, selecting the one located at a position closest to the detection position of the subject of interest in the previous frame.

In step S202, the CPU 151 determines whether or not the head and torso of the person were detected in step S201, and if detected, that is, if the detection result in step S201 exists, the process proceeds to step S203. On the other hand, if they were not detected, arbitrary processing is performed and then processing on the image of the current frame is ended. For example, until the subject is detected again, the defocus value of the next frame is not predicted, so the lens position of the focus lens 131 is fixed without being moved. Additionally, if either the head or the torso is detected, the defocus value of the detected head or torso may be calculated as focus state information and stored in the RAM 154 in association with the frame.

In step S203, the CPU 151 calculates a defocus value for each region of the detected head and torso of the subject, and stores the calculated defocus values in the RAM 154 in association with the frame.

In step S204, the CPU 151 determines whether the RAM 154 stores defocus values corresponding to the head and torso regions of the past frame. Note that in this embodiment, it is determined whether the defocus values of the immediately previous frame are stored, but it may be determined whether the defocus values of a frame older than the immediately previous frame are stored. If the defocus values corresponding to the head and torso regions of a past frame are stored, the process advances to step S205.

On the other hand, if it is determined in step S204 that the defocus values corresponding to the head and torso regions of a past frame are not stored, arbitrary processing is performed and the processing for the image of that frame is ended. For example, without predicting the defocus value of the next frame, after performing arbitrary processing, processing for the image of the current frame is ended. As the arbitrary processing, for example, focus adjustment may be performed in a conventional manner using the defocus value detected in the current frame. In addition, if a defocus value corresponding to the head or torso region is obtained in a past frame, the defocus value for the next frame can be predicted using the history of the defocus values corresponding to the head or torso region, and the focus lens 131 may be actuated based on the predicted result. The prediction method can be realized, for example, by calculating a regression curve based on the least squares method using the defocus values corresponding to each area in the past frame and the current frame and the times at which the images were captured.

In step S205, the CPU 151 predicts the defocus values of the next frame using the defocus values of the past frame and the defocus values of the current frame calculated in step S203. Prediction is performed for each region of the head and torso, respectively. The prediction method can be realized, for example, by calculating a regression curve based on the least squares method using the defocus values corresponding to each area in the past frame and the current frame and the times at which the images were captured.

Then, in step S206, the CPU 151 calculates the absolute difference between the predicted defocus values corresponding to respective regions of the head and torso determined in step S205. It can be said that the smaller the absolute value of the difference, the closer the two regions are to each other in the depth direction at the time for the prediction.

FIG. 4 is a diagram illustrating an example of the concept of the absolute differences between the defocus predicted values in this embodiment. Therefore, in order to make the explanation easier to understand, FIG. 4 shows deviation of the defocus values of the head relative to the defocus values of the torso with the defocus values of torso as references (0); in other words, FIG. 4 shows differences between the defocus values of the head and torso. In the following description, the defocus value of the torso will be referred to as a reference defocus value, and the deviation of the defocus value of the head relative to the defocus value of the torso will be referred to as the relative defocus amount.

That is, the absolute value of relative defocus amount of the head at future time $t_{(n+1)}$ that is predicted from the relative defocus amounts of the head with respect to the reference defocus values of the torso at time $t_{(n-1)}$ and time $t_n$ corresponds to the absolute difference of the predicted defocus values obtained in step S206.

In step S207, the CPU 151 determines whether the absolute difference calculated in step S206 is less than a threshold value (predetermined condition). Since the head and torso of the same subject are supposed to be at somewhat close positions, if the calculated absolute difference is greater than or equal to the threshold, it can be determined that the prediction of the head is likely to be incorrect.

For example, in the example of FIG. 4, it shows that the absolute value of the relative defocus amount of the head with respect to the reference defocus value of the torso at time $t_{(n+1)}$, that is, the absolute difference between the defocus values, is large and exceeds the threshold value. In such a case as the calculated absolute difference is greater than or equal to the threshold value, the prediction result of the head is not used and the lens position is maintained or the lens is driven to a position equal to the threshold value. This makes it possible to minimize the out-of-focus state of the head at time $t_{(n+1)}$. By suppressing the out-of-focus state, the head can be detected again at time $t_{(n+1)}$, and a prediction curve with higher likelihood can be redrawn. After performing other arbitrary processing, processing for the image of the current frame is ended. On the other hand, if the absolute difference is less than the threshold value, the process advances to step S208.

In step S208, the CPU 151 calculates the movement amount of the focus lens 131 to focus on the head area based on the predicted defocus value of the head area, and controls the focus control unit 133 to move the focus lens 131.

Note that in the above example, the subject is a person, and the defocus values corresponding to the head and torso regions are calculated, but the subject is not limited to a person, a plurality of parts may be detected from the subject, and prediction may be performed by calculating defocus values of regions corresponding to the plurality of parts. At this time, by determining the main part among the plurality of parts, it is possible to easily focus on the desired part.

As described above, according to the first embodiment, it is possible to detect that the prediction is failed for a subject for which defocus value prediction is difficult, and to move the focus lens based on the fact that the prediction is failed.

Modification 1

In the first embodiment described above, in step S207, it is determined whether the absolute difference between the predicted defocus values for the head and torso regions is less than a threshold value. This process is based on the premise that the defocus values of the head and torso of the same subject are close to some extent, but the degree of the closeness depends on the distance between the camera and the subject. For example, it is thought that the farther the subject is from the camera, the smaller the defocus difference between the head and the body becomes. Therefore, the threshold value may be adjusted to become smaller as the distance to the subject becomes longer.

Further, in the above-described first embodiment, the head and torso regions of a person are targeted, but the present invention may be applied for other subjects, such as animals and vehicles. In that case, the threshold value for the defocus difference used in step S207 may be adjusted depending on the type of the subject. For example, the defocus difference between the head and torso of a horse may be larger than that of a person, so the threshold value may be set larger.

Second Embodiment

Next, a second embodiment of the present invention will be described. Note that the configuration of an apparatus used in the second embodiment is the same as that of the image capturing apparatus 100 described with reference to FIG. 1 in the first embodiment, and the description thereof will be omitted.

FIG. 3 is a flowchart showing the flow of processing in the second embodiment. Note that processes similar to those shown in FIG. 2 are given the same step numbers, and descriptions thereof will be omitted as appropriate.

Figure 6:
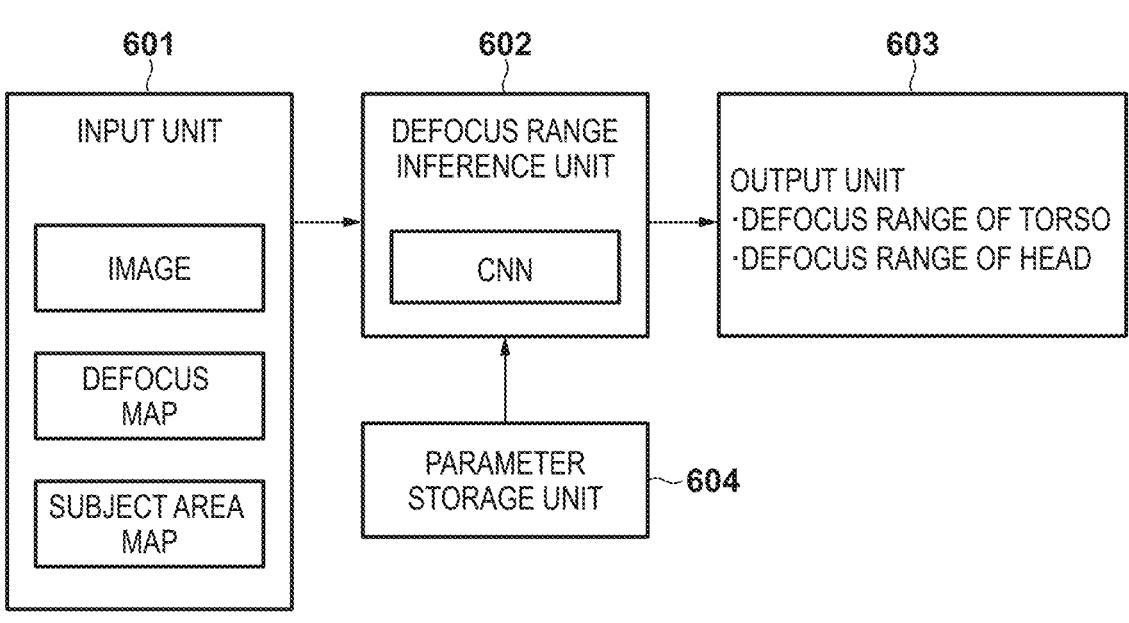
FIG. 6 is a diagram illustrating a configuration of a defocus range inference device according to the second embodiment.

If it is determined that the head and torso are detected in the current frame through the processes up to step S202, in step S303, the CPU 151 calculates a defocus range as information on the focus state for each area of the detected head and/or torso. For example, if the angle of view is narrow and a person shot as the subject occupies a large part of an image, depths of the head and torso are deep, so the range of the defocus value in the depth direction is detected. The defocus range may be calculated using an arbitrary method. In this embodiment, an inference device that uses CNN shown in FIG. 6 is used. Alternatively, for example, the defocus range may be calculated by calculating defocus values for a plurality of points in each part, and selecting the minimum value and maximum value from the calculated defocus values for each part.

FIG. 6 illustrates a configuration in which the defocus range is calculated using CNN in this embodiment. An input unit 601 receives the image output from the image signal processing unit 142, the defocus map output from the defocus calculation unit 163, and the subject area map output from the subject detection unit 162 as input information, integrates them into data having multiple channels, and input it into a defocus range inference unit 602. The input image, defocus map, and subject area map are upsampled and downsampled as appropriate to make the input sizes (resolutions) uniform.

The defocus range inference unit 602 receives parameters generated by machine learning and stored in a parameter storage unit 604, and infers a defocus range with respect to data input from the input unit 601 using the received parameters. The defocus range inference unit 602 outputs the defocus range corresponding to each part of the subject included in the image as an inference result. An output unit 603 outputs the defocus range of each part (head, torso, etc.) obtained from the defocus range inference unit 602 in association with meta information such as image ID.

Note that although the case where the detected subject is a person has been described here, the information acquired from the parameter storage unit 604 may be changed depending on the type of the subject to be detected. Although the cost for storing parameters is high, since information can be optimized according to the type of the subject, output accuracy will be improved. Further, the subject area map may be generated for each part of the subject, or only a subject area map of a specific part (for example, the torso) may be generated as a representative part of the subject.

Furthermore, in the present embodiment, the defocus range inference unit 602 is configured by a machine learned CNN, and infers the defocus range for each part of the subject. The defocus range inference unit 602 may be realized by a graphics processing unit (GPU) or a circuit specialized for estimation processing by a CNN. The defocus range inference unit 602 repeatedly performs convolution operations in a convolution layer and pooling in a pooling layer on the data input from the input unit 601 as appropriate. After that, the defocus range inference unit 602 performs global average pooling processing (GAP) to reduce data. Next, the defocus range inference unit 602 inputs the data subjected to GAP processing to the multilayer perceptron. After processing an arbitrary hidden layer, the defocus range inference unit 602 outputs a value at one end of the defocus range of each part via the output layer.

After calculating the defocus ranges in step S303, the CPU 151 determines in step S304 whether or not the defocus ranges corresponding to the head and torso regions of the past frame are stored in the RAM 154. Note that in this embodiment, it is determined whether the defocus ranges of the immediately previous frame are stored, but it may be determined whether the defocus range of a frame older than the immediately previous frame are stored. If no defocus range is stored, the CPU 151 performs an arbitrary processing and then ends the processing on the image of the current frame. For example, the same processing as described above in the first embodiment performed in a case of NO in step S204 may be performed using the defocus range. On the other hand, if any defocus range is saved, the process advances to step S305.

In step S305, the CPU 151 uses the defocus ranges of the past frame and the defocus ranges of the current frame calculated in step S303 to predict the defocus ranges of the next frame. Any prediction method may be used, and for example, prediction processing on the minimum and maximum values of the defocus ranges may be performed, respectively, and the results may be used as the minimum and maximum values of the defocus ranges of the next frame. Prediction is performed for each of the head and torso regions.

Next, in step S306, the CPU 151 expands the predicted range corresponding to the torso region obtained in step S305 by α times. Hereinafter, the predicted range expanded by α times will be referred to as "expanded predicted range." Note that α is a value of 1 or more, and may be a fixed value or may be changed depending on the situation. This expanded predicted range is regarded as a range where the head can exist.

Figure 5:
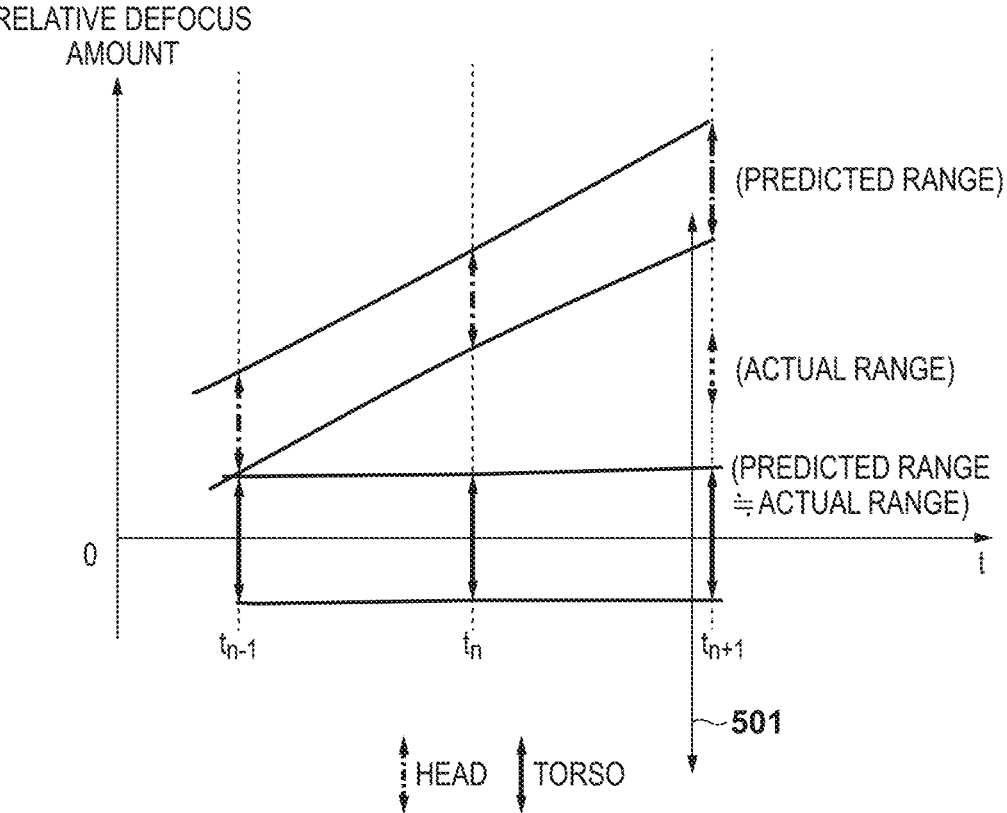
FIG. 5 is a diagram illustrating an example of the concept of an predicted range of a defocus range according to the second embodiment.

FIG. 5 is a diagram illustrating the concept of the predicted range of the defocus range in this embodiment. To make the explanation easier to understand, FIG. 5 shows the deviation of the defocus range of the head relative to the defocus range of the torso, with the defocus range of the torso as reference. In the following description, the defocus range of the torso will be referred to as a reference defocus range, and the relative deviation of the defocus range of the head from the defocus range of the torso will be referred to as a relative defocus range.

Regression curves are drawn for the minimum and maximum values of the reference defocus range of the torso and for the minimum and maximum values of the relative defocus range of the head at times $t_{(n-1)}$ and $t_n$, and the reference defocus range and the relative defocus range at time $t_{(n+1)}$ are predicted. Note that prediction may be performed using the median value and range of the defocus range instead of the minimum and maximum values. Furthermore, it is also possible to apply predictive calculations depending on the part; for example, since the head is nearly spherical, it is assumed that the defocus range changes little within a short period of time, so predictions may be made based only on the median value of the defocus range, and the range may be fixed.

Then, the reference defocus range predicted at time $t_{(n+1)}$ is multiplied by α (multiple times) to obtain the expanded predicted range 501.

In step S307, the CPU 151 determines whether the predicted relative defocus range of the head is included in the expanded predicted range calculated in step S306 (predetermined condition). If it is not included, it is determined that the prediction of the head is likely to be incorrect.

For example, in the example of FIG. 5, the predicted relative defocus range of the head at time $t_{(n+1)}$ is not included in the expanded predicted range 501, so it is determined that the prediction of the head is incorrect. In this case, as in the case of NO in step S207, by keeping the lens position without using the head prediction result, it is possible to prevent the head from being largely out of focus. After performing arbitrary processing, processing for the image of the current frame is ended.

On the other hand, if the predicted defocus range of the head is included in the expanded predicted range 501, the process advances to step S308.

In step S308, the CPU 151 calculates the movement amount of the focus lens 131 for focusing on the head area based on the predicted defocus range corresponding to the head area, and controls the focus control unit 133 to move the focus lens 131. Note that the position to be focused may be the closest position within the predicted defocus range, or may be the center of the predicted defocus range. Furthermore, the aperture may be adjusted so that the entire range is in focus.

As described above, according to the second embodiment, it is possible to detect that the prediction is failed for a subject for which defocus range prediction is difficult, and to move the focus lens based on the fact that the prediction is failed.

Modification 2

In step S306, the predicted defocus range of the torso is expanded by a times, and in step S307, it is determined whether the predicted defocus range of the head is included in the expanded range. Furthermore, in the second embodiment described above, the prediction is performed for the head and torso region of a person, but the present invention may be applied to other types of subjects, such as animals and vehicles. In that case, the value α (magnification) may be adjusted based on the type of subject. For example, if a photographer is viewing a horse from the side, the defocus ranges of the torso and face are considered to be close (that is, an appropriate value of α is close to 1).

Further, the value α may be adjusted depending on the posture of a subject. For example, if a photographer is viewing the horse from the side, the defocus ranges of the torso and face are considered to be close (that is, it is appropriate for the value α to be close to 1). On the other hand, if the photographer is viewing the horse from the front, the defocus values of the torso and face tend to be different (it is considered that it is appropriate to set a large value to α). It can be inferred that the horse is viewed from the side if the detection frame of the horse's torso is horizontally long. Alternatively, if tracking results indicates that the horse is moving laterally, it can be inferred that the horse is viewed from the side. Alternatively, if there is a pupil detector and only one eye is detected, it may be determined that the horse is viewed from the side. By inferring the posture using any of these methods and changing the value α accordingly, it is possible to make the prediction success/failure determination more reliable.

Furthermore, in the second embodiment described using FIG. 5, the defocus range of the torso is expanded equally in both the front and rear directions, but it is possible to expand it only in one direction or use different magnifications in the front and rear directions. For example, if the subject is a horse and it is facing a photographer (its face is closer to the photographer than the torso), it is conceivable to expand the defocus range of the torso only in the front direction (towards the photographer).

Modification 3

The threshold value used in step S207 in the first embodiment and the value of the magnification ratio α used in step S306 in the second embodiment may also be changed depending on the reliability of the subject detection result.

For example, consider a case where the reliability of defocus prediction for a head region of a person is calculated based on the defocus prediction result for a torso region of the person. If the detection result of the torso is incorrect, there is a high possibility that the defocus prediction result of the torso performed using the defocus information of that area will also be incorrect. Further, as a result, if a deviation of the defocus prediction result of the head region from the defocus prediction result of the torso becomes large, it may be determined that the defocus prediction of the head is incorrect even though it is correct. In such a case, by increasing the threshold value used in step S207 and the value of the magnification rate a used in step S306, it is possible to prevent the defocus prediction of the head from being determined to be incorrect. In other words, it is conceivable to make the threshold value and the value α larger as the detection reliability of the torso is lower.

Furthermore, it is conceivable that the lower the frame rate (the frequency of subject detection and AF processing), the lower the accuracy of defocus prediction. Therefore, it is conceivable to make the threshold value and the value α larger as the frame rate is lower.

Modification 4

In the first and second embodiments described above, the reliability of the defocus prediction for the head region of a person is calculated based on the defocus prediction result for the torso region of the person. This is based on the assumption that the movement of the torso is relatively slow compared to the movement of the head, and the prediction for the torso seldom fails while the prediction for the head fails more frequently. However, depending on the shooting scene, this assumption may be reversed.

Therefore, the amount of movement may be calculated for each part, and the part with the smaller calculated amount of movement may be used as a reference. Alternatively, if it is determined that the amount of movement of the head is smaller, arbitrary prediction processing and AF processing may be performed for the head, and the processing may be terminated without performing any prediction for the torso.

As the amount of movement, the distance traveled on the image plane within a predetermined period of time may be used. It can be determined that the smaller the moving distance, the smaller the amount of movement. For this moving distance, the distance between the center coordinates of the object detection results may be used, or tracking processing such as template matching may be used.

Furthermore, the change in appearance may be determined by calculating the total value of the amount of pixel change in each area of the subject. If this value is small, it may be estimated that the amount of movement of that part is small.

Alternatively, by using the defocus value of each frame and the lens movement amount, it is possible to calculate the amount of movement in the optical axis direction for each region. A region with a small amount of movement in the optical axis direction may be selected as the reference region.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No2023-097246, filed Jun. 13, 2023 which is hereby incorporated by reference herein in its entirety.

What is claimed is:

1. A focus adjustment apparatus comprising one or more processors and/or circuitry which functions as:

a detection unit that detects predetermined first part and second part of a predetermined subject from an image captured by shooting;

an acquisition unit that acquires a focus state of each of the first part and the second part detected by the detection unit;

a storage unit that stores the focus states of the first part and the second part acquired by the acquisition unit;

a prediction unit that, based on the focus states of the first part and the second part of an image obtained at a first time, and the focus states of the first part and the second part of an image, obtained at a second time before the first time, which are stored in the storage unit, predicts focus states of the first part and the second part at a third time after the first time;

a focus adjustment unit that performs focus adjustment processing; and a motion detection unit that detects an amount of motion of each of the first part and the second part, wherein the prediction unit performs prediction based on a smaller one of the amounts of movement of the first part and the second part, and wherein the focus adjusting unit performs the focus adjustment processing based on the predicted focus states of the first part and the second part in a case where a difference between the focus state of the first part and the focus state of the second part predicted by the prediction unit satisfies a predetermined condition.

2. The focus adjustment apparatus according to claim 1, wherein, in a case where the difference between the focus state of the first part and the focus state of the second part predicted by the prediction unit satisfies the predetermined condition, the focus adjustment unit performs the focus adjustment processing based on the predicted focus state of a predetermined one of the first part and the second part.

3. The focus adjustment apparatus according to claim 1, wherein the focus state is represented by a defocus value, and the predetermined condition is that an absolute value of the difference between the defocus value of the first part and the defocus value of the second part predicted by the prediction unit is smaller than a predetermined threshold.

4. The focus adjustment apparatus according to claim 3, wherein the farther a distance to the subject is, the smaller the threshold value is.

5. The focus adjustment apparatus according to claim 3, wherein the threshold value is changed depending on a type of the subject.

6. The focus adjustment apparatus according to claim 3, wherein the lower a reliability of a detection result of the subject is, the larger the threshold value is.

7. The focus adjustment apparatus according to claim 3, wherein the lower the frequency with which the first part and the second part are detected by the detection unit, the larger the threshold value is.

8. The focus adjustment apparatus according to claim 1, wherein the focus states are represented by defocus ranges of the first part and the second part, and the predetermined condition is that a predicted defocus range of the first part predicted by the prediction unit is included in a range obtained by expanding a predicted defocus range of the second part by a multiple times.

9. The focus adjustment apparatus according to claim 8, wherein a magnification for expanding the predicted defocus range of the second part is changed depending on a type of the subject.

10. The focus adjustment apparatus according to claim 8, wherein a magnification for expanding the predicted defocus range of the second part is changed according to an orientation of the subject.

11. The focus adjustment apparatus according to claim 8, wherein a direction of expanding the predicted defocus range of the second part is changed depending on a type of the subject.

12. The focus adjustment apparatus according to claim 8, wherein the lower a reliability of a detection result of the subject is, the larger a magnification for expanding the predicted defocus range of the second part is.

13. The focus adjustment apparatus according to claim 8, wherein the lower a frequency with which the first part and the second part are detected by the detection unit is, the larger a magnification for expanding the predicted defocus range of the second part is.

14. An image capturing apparatus comprising:

a focus detection apparatus comprising one or more processors and/or circuitry which functions as:

a detection unit that detects predetermined first part and second part of a predetermined subject from an image captured by shooting;

an acquisition unit that acquires a focus state of each of the first part and the second part detected by the detection unit;

a storage unit that stores the focus states of the first part and the second part acquired by the acquisition unit;

a prediction unit that, based on the focus states of the first part and the second part of an image obtained at a first time, and the focus states of the first part and the second part of an image, obtained at a second time before the first time, which are stored in the storage unit, predicts focus states of the first part and the second part at a third time after the first time;

a focus adjustment unit that performs focus adjustment processing; and a motion detection unit that detects an amount of motion of each of the first part and the second part, and an image sensor that captures the image, wherein the prediction unit performs prediction based on a smaller one of the amounts of movement of the first part and the second part, and wherein the focus adjusting unit performs the focus adjustment processing based on the predicted focus states of the first part and the second part in a case where a difference between the focus state of the first part and the focus state of the second part predicted by the prediction unit satisfies a predetermined condition.

15. The image capturing apparatus according to claim 14 further comprising a lens unit including a focus lens, wherein the focus adjustment unit determines a movement amount for moving the focus lens.

16. The image capturing apparatus according to claim 14 capable of attaching and detaching to/from a lens unit including a focus lens, wherein the focus adjustment unit determines a movement amount for moving the focus lens of the lens unit.

17. A focus adjustment method comprising:

detecting predetermined first part and second part of a predetermined subject from an image captured by shooting;

acquiring a focus state of each of the first part and the second part detected in the detecting;

storing the focus states of the first part and the second part acquired in the acquiring;

predicting, based on the focus states of the first part and the second part of an image obtained at a first time, and the focus states of the first part and the second part of an image, obtained at a second time before the first time, which are stored in the storage unit, focus states of the first part and the second part at a third time after the first time;

performing focus adjustment processing; and detecting an amount of motion of each of the first part and the second part, wherein the predicting is performed based on a smaller one of the amounts of movement of the first part and the second part, and wherein the focus adjustment processing is performed based on the predicted focus states of the first part and the second part in a case where a difference between the focus state of the first part and the focus state of the second part predicted in the predicting satisfies a pre-determined condition.

18. A non-transitory computer-readable storage medium, the storage medium storing a program that is executable by the computer, wherein the program includes program code for causing the computer to function as a focus adjustment apparatus comprising:

a detection unit that detects predetermined first part and second part of a predetermined subject from an image captured by shooting;

an acquisition unit that acquires a focus state of each of the first part and the second part detected by the detection unit;

a storage unit that stores the focus states of the first part and the second part acquired by the acquisition unit;

a prediction unit that, based on the focus states of the first part and the second part of an image obtained at a first time, and the focus states of the first part and the second part of an image, obtained at a second time before the first time, which are stored in the storage unit, predicts focus states of the first part and the second part at a third time after the first time;

a focus adjustment unit that performs focus adjustment processing; and a motion detection unit that detects an amount of motion of each of the first part and the second part, wherein the prediction unit performs prediction based on a smaller one of the amounts of movement of the first part and the second part, and wherein the focus adjusting unit performs the focus adjustment processing based on the predicted focus states of the first part and the second part in a case where a difference between the focus state of the first part and the focus state of the second part predicted by the prediction unit satisfies a predetermined condition.

\* \* \* \* \*